No. 786,546. PATENTED APR. 4, 1905.
H. G. CHAMBERLIN.
MEAT HOLDER FOR CARVING PLATTERS.
APPLICATION FILED SEPT. 5, 1903.

Witnesses:

Inventor:
Harry G. Chamberlin,
By Dyrenforth, Dyrenforth & Lee,
Att'ys

No. 786,546.    Patented April 4, 1905.

UNITED STATES PATENT OFFICE.

HARRY G. CHAMBERLIN, OF CHICAGO, ILLINOIS.

MEAT-HOLDER FOR CARVING-PLATTERS.

SPECIFICATION forming part of Letters Patent No. 786,546, dated April 4, 1905.

Application filed September 5, 1903. Serial No. 172,031.

*To all whom it may concern:*

Be it known that I, HARRY G. CHAMBERLIN, a citizen of the United States, residing at Chicago, in the county of Cook and State of Illinois, have invented a new and useful Improvement in Meat-Holders for Carving-Platters, of which the following is a specification.

In carving meat in the form of a roast or the like or poultry served on a platter the object being carved is required to be held on the platter by the fork in one hand of the carver while he uses the carving-knife with the other hand.

The object of my invention is to facilitate the operation of carving by dispensing with the requirement for holding on the platter with the fork the object being carved, thus to enable the carver to use more freely both implements in his hands to supplement one by the other in carving.

To this end I provide as a new article of manufacture a holder adapted to fit upon a carving-platter and afford a confining-seat thereon for the meat or poultry served upon the platter to be carved.

Figure 1:
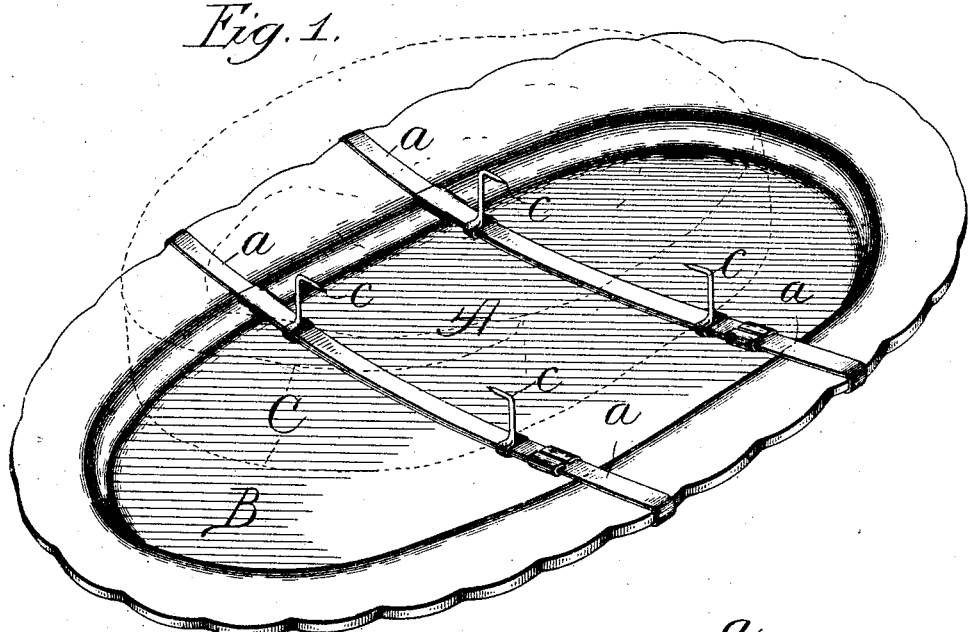
Figure 2:
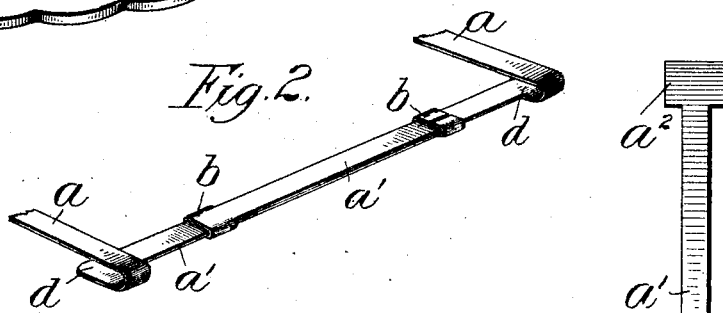
Figure 3:
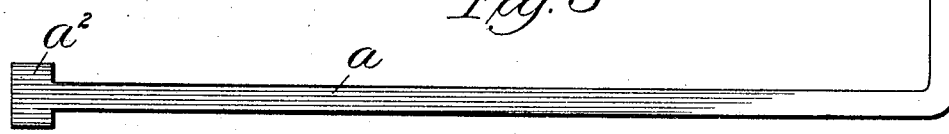

Referring to the accompanying drawings, Figure 1 is a perspective view of a platter equipped with my improved attachment holding meat to be carved, illustrated by a dotted representation; Fig. 2, a similar view of a broken portion of the vise, and Fig. 3 an enlarged plan view of the blank for one of the four sections of which the frame of the vise may be formed.

A is the frame, comprising four strips or sections of thin flexible metal or other suitable material, each having a longer arm $a$ and a shorter arm $a'$, extending at right angles one to the other, with an expanded head $a^2$ on the end of each arm for forming the loops $b$. (Represented in Figs. 1 and 2.) Two of these strips connected together to overlap and slide their arms $a$ one upon the other by embracing each with the loop $b$ on the other form one side of the frame, and two similarly-connected strips form its other side, and the arms $a'$ in a pair at each end of the frame are connected in the same way by the loop $b$ on each embracing the other. The frame thus formed may be expanded and contracted telescopically both lengthwise and transversely or in two directions at right angles to each other to adapt the holder to fit platters of different dimensions and to support objects to be carved of different sizes. As shown, the arms $a$ of the frame are bent toward their outer ends to bring the arms $a'$ underneath the frame and form hooks $d$ to engage with the edges of a platter B; but the engaging means may be provided in any other desired form without departure from my invention. On each side of the frame are provided two upright angular fingers $c$ $c$, pointed at their extremities, which extend toward each other, and looped at their bases about the arms $a$, carrying them to adapt the fingers to be adjusted back and forth on the frame.

If desired, the frame may be reinforced by one or more cross-braces between the sides at or near their transverse centers, though ordinarily no such reinforcement will be required.

To apply the holder, it is distended or contracted longitudinally to accord to the diametrical extent of the platter B and transversely according to the size of the object to be carved, and the holder is then applied in place by engaging its hook ends with opposite edges of the platter to cause the frame to extend transversely across it. The object to be carved, such as a roast of meat, (indicated at C,) is then imposed upon the frame between the members of the pairs of fingers $c$ $c$, which are then adjusted to penetrate the meat from opposite directions, thus to hold it vise-like upon the platter. The weight of the meat on the flexible frame depresses the latter to cause its sides to conform to the surface of the platter crossed by them, thereby causing the meat to rest upon a stable base, though it is not necessary as a feature of my invention that the frame shall be thus or at all flexible, for it may be rigid with the sides, conforming to the surface of the platter they cross or extending horizontally over it above its base to form a somewhat-elevated support on the platter for the meat. Moreover, the holder may be otherwise modified in matters of detail without departure from my invention, which is not, therefore, intended to be limited to the particular details of construction shown and described.

Instead of applying the holder to extend transversely across an oblong platter, as represented, it may be adapted to extend lengthwise over the same.

What I claim as new, and desire to secure by Letters Patent, is—

A meat or poultry holder for platters, comprising an expansible frame formed of four angular members each having one main arm extending crosswise of the platter and lapping and joined to the corresponding arm of an opposite member to telescope therewith and provided with a hooked portion for engagement with the platter sides, and having the other arm extending at a right angle to the main arm and lapping and joined to the corresponding arm of another member to telescope therewith, and hooks slidable on the lapped main arms to engage the meat or poultry laterally.

HARRY G. CHAMBERLIN.

In presence of—
M. S. MACKENZIE,
WALTER N. WINBERG.